United States Patent [19]

Muraldihara et al.

[11] Patent Number: 5,482,633

[45] Date of Patent: Jan. 9, 1996

[54] PROCESS FOR REMOVING VEGETABLE OIL WAXES BY FAST COOLING VEGETABLE OIL AND USING A POROUS NON-METALLIC INORGANIC FILTER

[75] Inventors: Harapanahalli S. Muraldihara; Bassam F. Jirjis, both of Plymouth; Gary F. Seymour, Howard Lake, all of Minn.

[73] Assignee: Cargill, Incorporated, Minneapolis, Minn.

[21] Appl. No.: 134,982

[22] Filed: Oct. 12, 1993

[51] Int. Cl.$^6$ .................................................. B01D 61/00
[52] U.S. Cl. ........................ 210/651; 210/650; 210/653; 210/774; 210/333; 426/417; 426/601; 554/174; 554/175
[58] Field of Search ..................................... 210/650, 651, 210/653, 106, 333.01, 791, 636, 774; 426/417, 601; 554/174, 175, 211; 204/186

[56] References Cited

U.S. PATENT DOCUMENTS

| | | |
|---|---|---|
| 2,159,434 | 5/1939 | Frey . |
| 2,619,421 | 11/1952 | Greenfield ............................... 554/211 |
| 2,780,617 | 2/1957 | Zletz . |
| 2,947,687 | 8/1960 | Lee . |
| 2,970,990 | 2/1961 | Cines . |
| 3,048,491 | 8/1962 | Gooding .................................. 554/211 |
| 3,056,772 | 10/1962 | Wallace . |
| 3,145,223 | 8/1964 | Little ....................................... 554/211 |
| 3,173,936 | 3/1965 | Kirkpatric .............................. 554/211 |
| 3,720,645 | 3/1973 | Nistri et al. . |
| 3,901,842 | 8/1975 | Dembowski . |
| 3,915,960 | 10/1975 | Jefferson et al. ........................ 554/211 |
| 4,069,157 | 1/1978 | Hoover et al. . |
| 4,107,026 | 8/1978 | Freeman .............................. 204/300 R |
| 4,130,485 | 12/1978 | Dyer et al. . |
| 4,200,509 | 4/1980 | Seguine ................................... 204/186 |
| 4,292,424 | 9/1981 | Huddleston et al. .................... 528/500 |
| 4,331,525 | 5/1982 | Huba et al. . |
| 4,331,695 | 5/1982 | Zosel ...................................... 426/417 |
| 4,414,157 | 11/1983 | Iwama et al. . |
| 4,500,706 | 2/1985 | Mathis et al. ........................... 528/502 |
| 4,533,501 | 8/1985 | Sen Gupta .............................. 554/211 |
| 4,545,940 | 10/1985 | Mutoh et al. ........................... 554/211 |
| 4,562,021 | 12/1985 | Alary et al. ............................... 264/43 |
| 4,603,109 | 7/1986 | Lillo ......................................... 435/41 |
| 4,661,634 | 4/1987 | Vaughn et al. .......................... 564/292 |
| 4,693,800 | 9/1987 | Edwards et al. ...................... 204/180.1 |
| 4,698,157 | 10/1987 | Gillot ...................................... 210/496 |
| 4,713,444 | 12/1987 | Matsuyama et al. ................... 528/502 |
| 4,724,078 | 2/1988 | Auriol et al. ............................ 210/490 |
| 4,749,488 | 6/1988 | Arthur et al. ........................... 210/490 |
| 4,816,140 | 3/1989 | Trambouze et al. ................... 208/309 |
| 4,826,607 | 5/1989 | Pearce ..................................... 210/770 |
| 4,833,078 | 5/1989 | Hsieh ...................................... 435/142 |
| 4,859,324 | 8/1989 | Levy et al. ............................ 210/195.2 |
| 4,940,562 | 7/1990 | Watanabe et al. ...................... 264/234 |
| 4,946,592 | 8/1990 | Galaj et al. ............................. 210/490 |
| 4,980,066 | 12/1990 | Slegers ................................... 210/636 |
| 5,066,504 | 11/1991 | Asbeck et al. ......................... 426/417 |

OTHER PUBLICATIONS

Mattil, Norris, Stirton, and Swern, *Bailey's Industrial Oil and Fat Products*, Interscience Publishers, Second Edition, pp. 868–872 (1951).

Rivarola, Anon, and Calvelo, "Crystallization of Waxes During Sunflowerseed Oil Refining," JAOCS, vol. 62, No. 10 (Oct. 1985).

*Primary Examiner*—Robert A. Dawson
*Assistant Examiner*—Ana M. Fortuna
*Attorney, Agent, or Firm*—Fitch, Even, Tabin & Flannery

[57] ABSTRACT

This invention provides for the separation of higher melting glycerides from vegetable oils. After the vegetable oil is refined and bleached, it is rapidly cooled to provide a blend that contains the vegetable oil and wax particulate; the blend then is filtered through a nonmetallic inorganic filter to remove the wax particulate from the vegetable oil such that the permeate oil has less than about 10 ppm oil at about 65° F.

24 Claims, 2 Drawing Sheets

PROCESS FOR REMOVING VEGETABLE OIL WAXES BY FAST COOLING VEGETABLE OIL AND USING A POROUS NON-METALLIC INORGANIC FILTER

FIELD OF THE INVENTION

This invention provides for the separation of solid particulate higher-melting glycerides dispersed in vegetable oil.

BACKGROUND OF THE INVENTION

Prior to human consumption, vegetable oil undergoes processing which generally includes bleaching, deodorization and the removal of unwanted particulate material. The unwanted particulate material includes wax which shall mean for the purposes herein high melting glycercides such as saturated glycerides having 16 to 18 carbons.

Typically vegetable oil is extracted from seed, refined and bleached. After bleaching, the hot oil, usually about 120° F., may be transferred to a "winterization" unit. Winterization is the process by which higher-melting glycerides are crystallized for removal from the oil. Some vegetable oils require winterization and the removal of higher melting glycerides to avoid problems in the use of the oils at lower temperatures and in later processing. Other vegetable oils do not require winterization to remain processable at lower temperatures. A detailed discussion of winterization of vegetable oil is provided in Industial Oil and Fat Products by Alton E. Bailey (Interscience Publishers, 1951) at pages 868 through 872 which discussion is incorporated herein by reference.

The waxes are separated from the oils by employing crystallization techniques. After the wax is crystallized, the wax is separated from the oils in filter presses using pre-coated plates of diatomaceous earth.

Prior to this invention, it has been generally thought that during winterization for the formation of wax crystals in the oils, the temperature of the oils are lowered at a slow cooling rate to allow crystallization so that a true solid liquid separation process can be effected. It also has been known to add a small amount of seed material to allow the waxes to nucleate and grow. About 3% to about 5%, based upon the weight of the oil, of diatomaceous earth has been added as a seed material to the chilled oil and mixed. It has been generally believed, however, that the oil should be cooled slowly and carefully to avoid difficulty in the filtration process. This slow cooling has not been necessarily energy efficient particularly if heating is required to control the cooling rate. Further, the slow cooling of the oil would slow the production of winterized refined oil.

Generally in the filtration process, it has been known to pass the oil/wax particulate mixture perpendicular to the pre-coated plate and frame filter with dead-end pressure filtration to form a cake. The cake then serves as a filter to capture the particles, but allows the oil to permeate through the cake. Prior to filtration, the typical inlet concentration of wax in the case of, for example, sunflower oil, is between about 300 ppm to about 1000 ppm. The filtered oil for commercial or industrial use should pass a three day chill test and have a particulate concentration of less than about 50 ppm.

After operation of the plate and frame filter press, the diatomaceous earth is soaked with oil and is a waste product which requires disposal. Analysis of samples of this diatomaceous earth material indicates that the material comprises about 50 to about 65 weight percent oil. In one plant, about 544 tons of diatomaceous earth is used annually. This means that just from one plant, there is a loss of hundreds of tons of oil annually from the filtration of wax from oil. Therefore, it is desirable to develop a process for removing waxes and other particulate materials from oils without this substantial loss of oil, not only to reduce costs arising from lost oil, but also to reduce costs and environmental problems arising from the necessity of the disposal of the diatomaceous earth soaked with oil.

Another problem with dead end filtration with diatomaceous earth is that once a cake is formed, the pre-coat of diatomaceous earth adheres very strongly to the filter. Mechanical rakes are necessary to clean the surface of the filter. The mechanical raking is labor intensive and is therefore expensive. Thus, it is highly desirable to develop a process that would not require such a substantial effort for cleaning the filter presses.

Yet another problem with the dead end plate and frame filtration process is that the wax particles and the oil travel in the same direction and the flow of the feed to the filter is perpendicular to the surface of the filter. Therefore over a period of time, particulate wax material builds up as a cake and the cake resistance is greater than the filter resistance. Therefore, the filtration declines steadily as a function of time. It is highly desirable to develop a process in which the filtration operation is continuous and does not readily decline as a function of time.

It is an object of this invention to provide a rapid energy efficient continuous process for treating vegetable oils, which process is effective without a slow cooling of the oil, but which is economic and produces a vegetable oil that is not turbid at lower temperatures.

It is also an object of this invention to provide a process which eliminates the need for filter aids, such as diatomaceous earth, in the separation of particulate materials from vegetable oils.

It is another object of this invention to reduce or eliminate the generation of wax permeated with diatomaceous earth.

Still further objects and advantages of the invention will be found by reference to the following description.

SUMMARY OF THE INVENTION

This inventions provides a method for the separation of unwanted particulate materials which include wax from winterized vegetable oil. The method includes providing vegetable oil which has been heated to a temperature above the melting point of the higher melting glycerices in the oil, crash cooling the vegetable oil from a temperature of from about 220° F. to about 60° F. at a rate of at least about 100° F. per hour; permitting the oil to mature at a temperature at not more than about 60° F. for at least about 6 hours to permit the wax in the oil to crystallize to a particle size of between about 0.1 to about 50 microns, where the wax particles are typically higher-melting glycerides from the vegetable oil; and filtering the vegetable oil/particulate wax blend through a porous nonmetallic inorganic filter having a pore size of from about 0.1μ to about 0.5μ to remove the particulate wax and other unwanted particulate materials and provide a permeate oil which will have less than about 10 ppm wax at about 65° F. and pass a three-day chill test. In an important aspect, the vegetable oil is cooled at a rate of between about 100° F. per hour to about 3000° F. per hour and is cross flow filtered at a temperature in the range of from about 60° F. to about 67° F. In another important aspect, the filter is a ceramic membrane that is made from alumina oxide or zirconia oxide having a pore size of between about 0.1 to about 10 microns.

In another important aspect, the invention permits the efficient collection of the crystallized waxes from the oil without having undesirable substances such as diatomaceous earth being introduced into the wax by the oil purification process.

The invention herein is not limited to any specific edible vegetable oil, but the vegetable oils that have been winterized for the removal of particulate wax are of particular interest for use with the invention.

DESCRIPTION OF THE PREFERRED EMBODIMENTS

Figure 1:
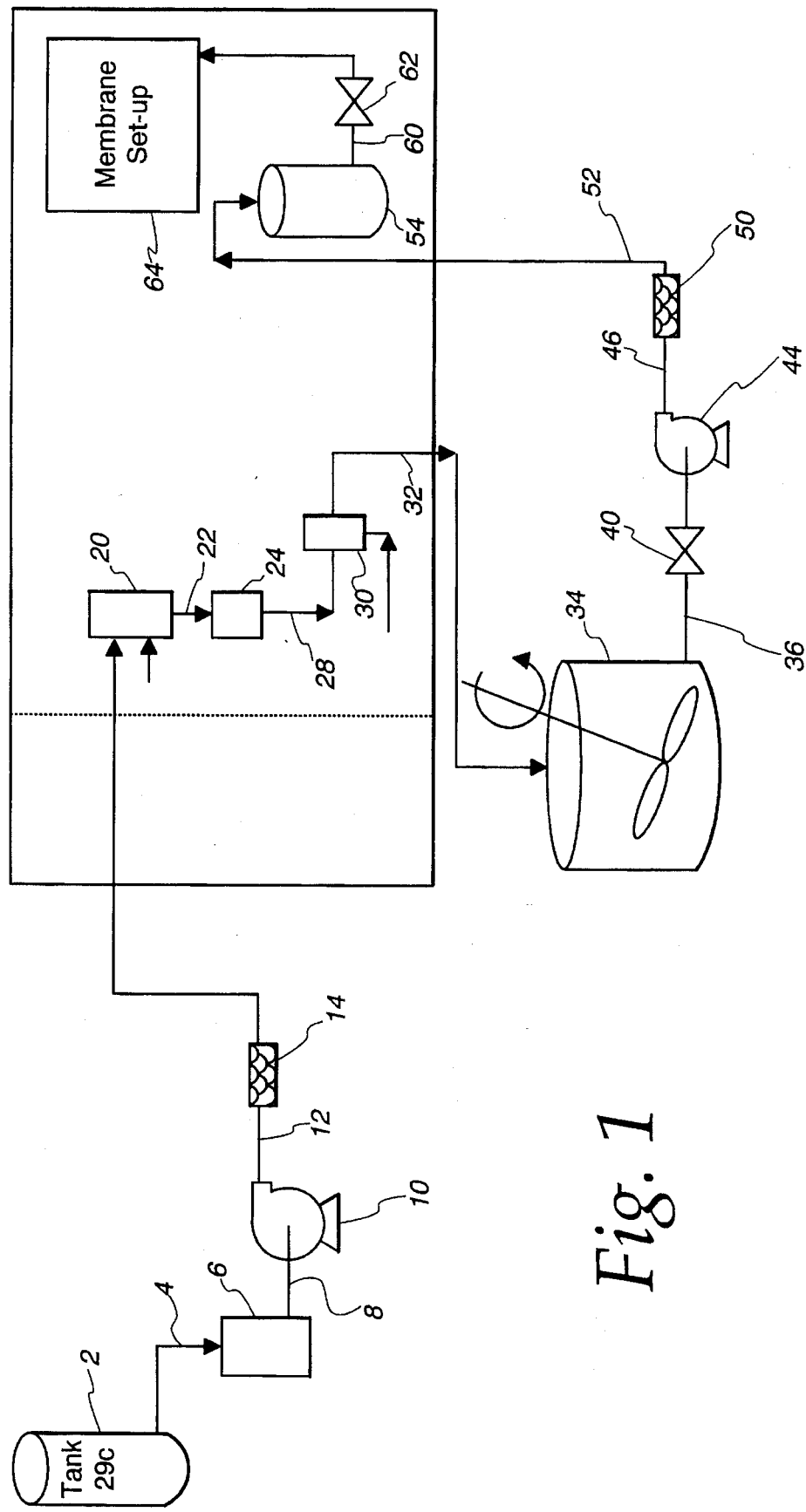
FIG. 1 is a schematic diagram of a separation system according to the invention.

"Cross-flow filtration" means that the product flow and the feed flow are approximately perpendicular, whereas in dead end filtration, the product and feed flows are oncurrent or are in the same direction.

"Porous ceramic filter" means a porous filter made from a clay, which clay includes aluminum, silicon and water, zirconia, silica, titania and other coatings including carbon and glass, such as the filters described in U.S. Pat. No. 4,069,157 to Hoover et.al., which is incorporated as if fully written herein.

"Nonmetallic inorganic filter" includes ceramic filters and means a porous filter made from sintered metal oxides and hydroxides including sintered alumina, sintered ceramics, and microporous glass such as those described in U.S. Pat. Nos. 4,562,021, 4,724,078, 4,698,157 and 4,946,592, which are incorporated as if fully written herein.

"Membrane flux" means the amount of permeate oil passing through the membrane or filter per unit of time per unit of membrane surface area.

"Transmembrane pressure drop" is defined as the average of the inlet and outlet pressures less the permeate pressure or can be expressed as $$\frac{P_1 + P_2}{2} - P_3.$$

Where, $P_1$ is the inlet pressure, $P_2$ is the outlet pressure and $P_3$ is the permeate pressure.

A "three-day chill test" means permeate dried at 130° C. for 1 hour, refrigerated at 45° F., 3 days.

A "ten-day chill test" means permeate dried at 130° C., for 1 hour, refrigerated at 45° F., 10 days.

"Wax" means particulate high melting point glycerides which have a melting point of greater than about 67° F. and which are crystallized from vegetable oil by a winterization process.

This invention provides for the separation of unwanted particulate materials including particulate wax from vegetable oils. The particulate wax has a particle size between about 0.1μ to about 50μ. The invention includes a method which comprises providing oil which has a temperature above about the melting point of the wax in the oil, above about 220° F., crash cooling the vegetable oil from a temperature of from about 220° F. to about 60° F. at a rate of at least about 100° F. per hour; crystallizing the wax in the oil to a cross sectional particle size of between about 0.1 to about 50 microns by maturing the crash cooled oil at a temperature of not more than about 60° F. for at least about 0.17 hours; and cross flow filtering the vegetable oil/wax blend through a porous nonmetallic inorganic filter having a pore size of from about 0.1 to about 10 microns, and preferably from about 0.1μ to about 0.5μ. The method of the invention not only removes the wax and other impurities from the oil, but provides a permeate oil which will have less than about 10 ppm wax at about 65° F. and pass a three-day chill test. In one aspect the oil is cross flow filtered.

In an important aspect the oil is cooled at a rate of between about 100° F. per hour to about 3000° F. per hour and is filtered at a temperature range of from about 60° F. to about 67° F. through a ceramic membrane that is made from alumina oxide or zirconia oxide having a pore size of between about 0.1 to about 0.5 microns.

In practicing the invention, the vegetable oil which includes the wax particulate has a viscosity in the range of from about 90 cps to about 70 cps as measured by Brookfield Viscometer, Model RV, with a No. 1 spindle, 50 rpm, at a temperature of about 60° to about 65° F., and preferably from about 70 to about 90 cps. The mixture is cross-flow filtered at a cross-flow rate in the range of from about 3 to about 9 feet/second (about 1 to about 3 meters/sec). According to the method, the mixture passes through the filter at a rate of about 1.4 to about 1.02 gal./hr./ft.$^2$ or about 55 to about 40 liter/hr/m$^2$ of filter surface area. The initial flux is preferably between about 55 to about 45 liter/hr/m$^2$, when the transmembrane pressure is between about 28 to about 37 psi. The transmembrane pressure drop across the filter is in the range of between about 10 psig to about 60 psig.

In a further aspect of the method, for every period of cross-flow filtration in the range between about 3 to about 5 minutes, the method of the invention includes at least about one backflush for a time in the range of about 2 to about 5 seconds at a back pressure of from about 60 to about 250 psi, and preferably at about 140 psi.

After crash cooling and maturation of the oil to crystallize the wax therein, the oil/wax blend contains from about 500 to about 1000 ppm particulates, mostly wax particles, having a particle size of from about 0.1 micron to about 50 microns, although other residual matter from the oil refining process may be present. The concentration of the wax can have an effect upon the flux decay. Typically, the flux decay is between about 40 to about 50 percent for a mixture having an initial wax concentration between about 330 to about 660 ppm. The decline of the flux is less for a mixture that contained less wax. The filter performance over a period of time gradually reduces. Therefore, the inorganic nonmetallic filters should be cleaned to regenerate to its original flux capability. The cleaning agent is run through the filter for a time and temperature effective for cleaning the filter, and the filter is returned to a condition of about its original membrane flux rate. To rejuvenate the filter, typically the cleaning agent is run through the filter for about 5 to about 30 minutes and preferably about 10 minutes.

The permeate oil that flows through the pores of the filter should be a function of pore diameter, the number of pores, the applied pressure and the thickness of the filter. Therefore, the flux through the filter should be directly proportional to the square diameter of the pore size of the filter. However, when the pore size of the filter is at least 0.5 microns the pores of the filter plug at a faster rate than would be expected. Therefore, a filter having a pore size of at least about 0.5 microns is preferred.

The permeate flux is a function of time, as well as the size of the wax crystals. Hence, a further aspect of the invention is the use of clean oil to regenerate the filter after a designated period of use. The filter is usually cleaned about 0.1 to about 0.5 hours where the flow of the mixture is between about 1.4 to about 1.02 gal./hr./ft.$^2$. There are many benefits to using warm clean oil to regenerate the filter. One benefit is that solvents that are hazardous to the environment are not needed, so that there is no need for handling, treating, regenerating/disposing of these solvents.

A ceramic filter having a pore size of about 0.1 to about 0.5μ filtering sunflower wax at about 65° F. where the wax concentration is about 900 ppm yields about 45 liter/hr./m$^2$ grams/min flux. However, after filtering for six hours, the flux drops to about 42 liters/hr./m$^2$. To clean the filter, clean oil having a temperature in the range of from about 110° F. to about 200° F., preferably about 150° F., may be pumped into the filter unit and the temperature of the oil inlet unit may be about 150° F. At the end of 30 minutes of such cleaning, the flux returns to its original level. Another important aspect of the invention is that the oil is more non-aqueous which means that the mixture does not have more than about 0.1 weight percent water.

The process permits the reduction of waxes in the vegetable oil such that after filtration there is less than about 10 ppm and preferably from about 5 to about 10 ppm. of wax at about 65° F. in the vegetable oil. Elimination of diatomaceous earth and filter papers eliminates or reduces waste and reduces resin manufacturing costs.

Referring to FIG. 1, feed tank 2 holds bleached vegetable oil having about 700 ppm wax at about 29° C. Outlet feed line 4 supplies the vegetable oil from feed tank 2 to level control reservoir 6. Reservoir outlet feed line 8 feeds vegetable oil from the level control reservoir through variable speed pump 10 to feed line 12 and flow meter 14 to heat exchanger 20. The vegetable oil is heated with steam at about 25 psi in the heat exchanger 20 to about 160° F. The 160° F. vegetable oil is fed from heat exchanger 20 through heat exchanger outlet line 22 to hot oil holding tank 24. The 160° F. oil is fed from the hot oil holding tank through a hot oil holding tank outlet line 28 into a cooling heat exchanger 30 where the oil is crash cooled from about 160° F. to about 60° F. in less than about 3 minutes. The 60° F. oil is fed from the cooling heat exchanger through maturation tank inlet line 32 to a maturation tank 34. The oil is held in the maturation tank for about 0.17 to about 6 hours at a temperature of not more than about 60° F., preferably at about 55° to about 60° F., and is stirred at about 12 rpm. The wax in the oil crystallizes to form a particulate wax/oil blend. The particulate wax/oil blend is fed preferably at from about 60° to about 67° F. from the maturation tank through maturation tank outlet line 36 through valve 40 to variable speed pump 44 which feed the blend through line 46 to flow meter 50 to wax/oil blend feed line 52. Feed line 52 feeds the wax/oil blend to a particulate wax/oil blend holding tank 54 which serves as a feed reservoir for the filtration membrane system shown in FIG. 2. Wax/oil blend holding tank outlet line 60 feeds the wax/oil blend through control valve 62 to the membrane filtration system 64 for filtration and removal from the particulate wax from the oil.

Figure 2:
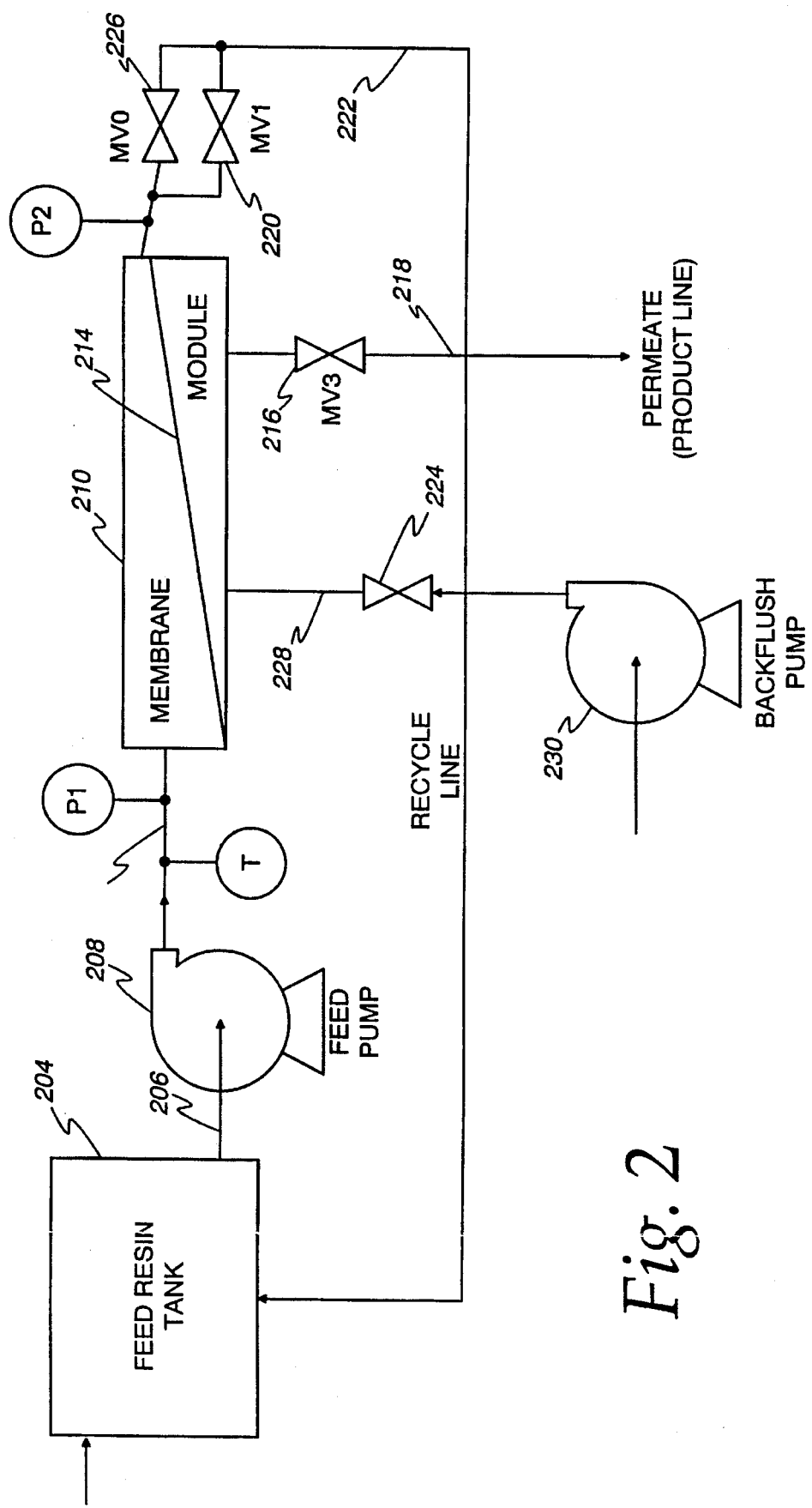
FIG. 2 is a schematic diagram of the membrane system used according to the invention as also seen in U.S. Pat. No. 5,252,218 to Muraldihara et al., issued Oct. 12, 1993.

FIG. 2 shows the detail of the membrane filtration system. As seen in FIG. 2, the particulate wax/oil blend is pumped through line 206 from the feed tank 204 with pump 208 to membrane module 210. The blend is pumped into the module at about 1 to about 4 psig. The membrane module has a ceramic filter 214. The ceramic filter has a pore size of about 0.5 microns. The ceramic filter is commercially available as Membralox Ceramic Membrane from United States Filter Corporation, Palm Desert, Calif. During normal filtering, valve 216 to product line 218 is open, valve 220 to recycle line 222 is closed and backflush valve 224 is closed. Valve 226 controls the transmembrane pressure drop in the membrane module. The transmembrane pressure drop, as defined above, is about 20 psig. The membrane flux is from about 55 liter/hr./m$^2$ to about 1.4 gal./hr./ft.$^2$ for a membrane with about a 0.5 micron pore size. The cross-flow rate of the dispersion to the filter is about 6 feet/second. The backflush valve 224 and line 228 may be combined with product line 218 and valve 216. During normal filtering operation, the particulate is collected through product line 218 and the retentate or concentrate is fed back through into the feed tank through line 222.

In a second or backflush mode, valves 220 and 224 are open and valve 216 is closed, and pump 230 pushes particulate or permeate back through the filter from the permeate side of the filter to the inside or concentrated side of the filter to sweep the particulate off the filter surface at a pressure of about 80 psig.

The following examples set forth aspects of the invention as well as a comparison of the invention as to similar processes.

EXAMPLE I

A mixture containing sunflower oil with about 670 ppm wax was circulated through ceramic membrane (Membralox, P. 19. 60, 0.3m$^2$ surface area from U.S. Filter Corporation, Palm Desert, Calif.). Filtration was done at 65° F. with a transmembrane pressure of about 25 psig for a membrane pore size of 0.5μ.

Feed oil was crash cooled from about 160° F. to about 60° F. in about 3 minutes and maturated for about 6 hours at about 60° F.

Initial flux was 42 liters/hr./m$^2$, and no drop in flux was observed for about 8 hours. Backflushing was done every 3 minutes for 5 seconds, backflush pressure was 100 psig. Oil produced from this test passed the 3-day chill test.

EXAMPLE II

A mixture containing sunflower oil with about 670 ppm wax was circulated through ceramic membrane (Membralox P. 19. 60, surface area 0.3m$^2$ from U.S. Filter Corporation, Palm Desert, Calif.). Filtration was done at 65° F. with a transmembrane pressure of about 25 psig for a membrane pore size of 0.5 micron.

Feed oil was crash cooled from about 160° F. to about 60° F. in about 3 minutes and maturated for about 10 minutes at about 60° F.

Initial flux was 30 liters/hr./m$^2$ and the flux at the end of 2.5 hours was 36 liters/hr./m$^2$. Backflushing was done every 3 minutes for 5 seconds. Backflush pressure was 100 psig.

EXAMPLE III

Sunflower oil was heated to 160° F. by pumping it at a rate of 3 gal./min. through a plate and frame heat exchanger. Saturated steam at 25 psi was used to heat the oil to 160° F. The 160° F. oil passes through a 40-gal jacketed tank to keep the oil temperature at 160° F. The resident time of the oil in the tank is 13 minutes. This allows enough time for the wax crystals to get dissolved in the oil phase. The 160° F. oil exits the holding tank and passes though another heat exchanger where it is cooled from 160° F. to 60° F. at the rate of 3615° F./hr. 20 gal./min. of 30% glycol at 34° F. was used in the jacket of the heat exchanger to cool the oil to 60° F. The cooled oil is loaded into a 1000 gallon jacketed tank where it was maturated at 60° F. for the maturation time. The oil is agitated at rate of 12 rpm in the 1000 gallon tank using a wide sweep agitator. Once the maturation period is finished, the oil is pumped into a 100-gallon jacketed tank where it was fed into the ceramic membrane unit at rate of 3 GPM.

Using the above procedure, three wax microfiltration tests were conducted at varying maturation times to study the effect of maturation time of crashed cooled refined bleached (RB) sunflower oil on the membrane permeate flux and oil quality. The oil had an initial wax concentration of 700 ppm. The results are shown in the table below.

| Maturation Time | Test Duration Hrs. | Initial Flux L/hr. m² | Final Flux L/hr. m² | Oil Quality (3-day chill test) | Percent Flux Decline |
|---|---|---|---|---|---|
| 10 minutes | 8 | 44 | 31.5 | Passed | 28.4 |
| 3 hours | 8 | 44 | 38 | Passed | 13.6 |
| 6 hours | 22 | 44 | 42 | Passed | 4.5 |

The above results indicate that using 6 hours maturation time resulted in a higher membrane flux and the least flux decline. Longer maturation time will lead to larger wax crystals and thus higher membrane flux. The filtered oil from all three tests was very clear (about 0 ppm wax) and all permeate (filtered oil) samples passed 10 days chill test.

Although the invention has been described with regard to its preferred embodiments, it should be understood that various changes and modifications as would be obvious to one having the ordinary skill in this art may be made without departing from the scope of the invention which is set forth in the claims appended hereto.

The various features of this invention which are believed new are set forth in the following claims.

What is claimed is:

1. A method for processing a vegetable oil containing wax, the method comprising:
   providing the vegetable oil having a temperature of at least about 220° F.;
   cooling the vegetable oil from a temperature of from about 220° F. to about 60° F. at a rate of at least about 100° F. per hour;
   crystallizing wax in the oil to a cross sectional particle size of between about 0.1 to about 50 microns to provide an oil/crystallized particulate wax blend; and
   cross-flow filtering the oil/wax blend through a porous nonmetallic inorganic filter to separate the particulate wax from the oil to provide a permeate oil having less than about 10 ppm. wax particulate at about 65° F.

2. The method of claim 1 wherein the oil/wax blend is cross-flow filtered through the filter which has a pore size in the range of from about 0.1 to about 10 microns at a cross-flow rate in the range of from about 3.0 to about 9.0 feet/second (1 to 3m/sec) to separate the particulate wax from the oil.

3. The method of claim 1, wherein the filter has a pore size of between about 0.1 to about 10 microns.

4. The method as recited in claim 3 wherein there is at least about 1 backflush at a rate of about 2 to about 5 seconds for about every 3 to about 5 minutes of cross-flow filtration.

5. The method of claim 1, wherein the oil/wax blend is filtered at a temperature range of from about 60° F. to about 67° F.

6. A method as recited in claims 1 or 5 wherein the filtrate passes through the filter at a rate in the range of from about 1.4 to about 1.02 gal./hr./sq. foot (about 55 to about 40 liter/hr./m²) of the filter surface area exposed to the cross flow.

7. The method of claim 1, which further comprises backflushing the nonmetallic inorganic filter.

8. The method of claim 1, wherein the porous nonmetallic inorganic filter is a porous ceramic filter.

9. The method of claim 6 wherein the porous ceramic filter is made from alumina oxide or zirconia oxide.

10. The method of claim 6, wherein the porous ceramic filter is made from material selected from the group consisting of sintered metal oxides or hydroxides, sintered alumina, sintered ceramics and microporous glass.

11. The method of claim 1, wherein the viscosity of the cooled blend is between about 70 to about 90 cps.

12. The method of claim 1, wherein the oil/particulate wax blend is filtered at a temperature in the range of from about 60° F. to about 67° F., the inorganic filter has a pore size range of from about 0.1 to about 10 microns and the inorganic filter is made from material selected from the group consisting of sintered metal oxides or hydroxides, sintered alumina, sintered ceramics and microporous glass.

13. The method of claim 1, wherein the cross flow is about 6 ft./sec.

14. A method for processing a vegetable oil, the method comprising:
   cooling the oil that has a temperature of at least about 220° F. at a rate of at least about 100° F. per hour to a temperature of about 60° F. to provide a wax/oil blend;
   retaining the wax/oil blend in a maturator at a temperature of not more than about 60° F. for about 10 minutes to about 6 hours to thereby form an oil/crystallized particulate wax blend which blend includes particulate wax having a cross sectional size of from about 0.1 to about 50 microns;
   filtering the oil/particulate wax blend at a temperature in the range of from about 60° F. to about 67° F. through a porous nonmetallic inorganic filter having a pore size in the range of from about 0.1 to about 10 microns to provide a permeate oil having less than about 10 ppm particulate wax at about 65° F.

15. The method of claim 14, wherein the filtering is cross-flow filtering at a cross-flow rate in the range of from about 3.0 to about 9.0 feet/second (1 to 3 m/sec) to separate the particulate from the oil and wherein the method which further comprises backflushing the nonmetallic inorganic filter.

16. A method as recited in claims 15 wherein the filtrate passes through the filter at a rate in the range of from about 1.4 to about 1.02 gal./hr./sq. ft. (about 55 to about 40 liters/hr./m²) of the filter surface area exposed to the cross flow.

17. The method of claim 16, wherein the cross flow is about 6 ft./sec.

18. The method of claim 14 or 15 wherein the vegetable oil has a temperature of about 60° F. upon entering the maturator and has an exit temperature between about 40° F. and about 42° F.

19. The method of claim 14, wherein the porous nonmetallic inorganic filter is a porous ceramic filter.

20. The method as recited in claim 19 wherein there is at least about 1 backflush at a rate of about 2 to about 5 seconds for about every 3 to about 5 minutes of cross-flow filtration.

21. The method of claim 19, wherein the porous ceramic filter is made from material selected from the group consisting of sintered metal oxides or hydroxides, sintered alumina, sintered ceramics and microporous glass.

22. The method of claim 14, wherein the viscosity of the cooled blend is between about 70 to about 90 cps.

23. The method of claim 14, wherein the inorganic filter has a pore size range between about 0.1 to about 0.5 microns.

24. The method of claim 14 wherein the porous nonmetallic inorganic filter is made from alumina oxide or zirconia oxide.

* * * * *